(12) United States Patent
Andelson et al.

(10) Patent No.: US 11,448,126 B1
(45) Date of Patent: Sep. 20, 2022

(54) DUAL-PRESSURE SOURCE AIRCRAFT PNEUMATIC SYSTEM WITH PRESSURE RELIEF

(71) Applicant: ROHR, INC., Chula Vista, CA (US)

(72) Inventors: Phillip Andelson, San Diego, CA (US); Edward J Porth, San Diego, CA (US); Alex Suares, Lakeside, CA (US); Jeffrey Eishen, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/341,282

(22) Filed: Jun. 7, 2021

(51) Int. Cl.
| | |
|---|---|
| *F02C 6/08* | (2006.01) |
| *F02C 9/18* | (2006.01) |
| *B64D 13/06* | (2006.01) |
| *F01D 21/00* | (2006.01) |
| *B64D 15/04* | (2006.01) |

(52) U.S. Cl.
CPC .............. *F02C 6/08* (2013.01); *B64D 13/06* (2013.01); *B64D 15/04* (2013.01); *F01D 21/003* (2013.01); *F02C 9/18* (2013.01); *F05D 2220/323* (2013.01); *F05D 2260/605* (2013.01); *F05D 2260/606* (2013.01); *F05D 2260/80* (2013.01); *F05D 2270/301* (2013.01); *F05D 2270/44* (2013.01); *F05D 2270/80* (2013.01)

(58) Field of Classification Search
CPC ... F02C 6/08; F02C 9/18; B64D 13/06; B64D 15/04; F01D 21/003; F05D 2220/323; F05D 2260/605; F05D 2260/606; F05D 2260/80; F05D 2270/301; F05D 2270/44; F05D 2270/80
See application file for complete search history.

(56) References Cited

U.S. PATENT DOCUMENTS

| | | |
|---|---|---|
| 8,955,794 B2 | 2/2015 | Mackin et al. |
| 10,926,883 B2 | 2/2021 | Kamenetz et al. |
| 2005/0022879 A1* | 2/2005 | Hess ................... F16K 31/0655 137/599.18 |
| 2012/0045317 A1 | 2/2012 | Saladino |
| 2017/0101937 A1* | 4/2017 | Schlarman ................ F02C 3/04 |
| 2017/0298836 A1* | 10/2017 | Tiwari ................. F01D 17/105 |
| 2018/0340474 A1* | 11/2018 | Baladi ....................... F02C 6/08 |
| 2020/0040902 A1* | 2/2020 | DeFelice ............... F04D 27/023 |

* cited by examiner

*Primary Examiner* — Todd E Manahan
*Assistant Examiner* — Rodolphe Andre Chabreyrie
(74) *Attorney, Agent, or Firm* — Snell & Wilmer L.L.P.

(57) ABSTRACT

A bleed air system for a pneumatic system of an aircraft includes a low-pressure bleed tap configured to bleed a low-pressure compressed air from a low-pressure source; a high-pressure bleed tap configured to bleed a high-pressure compressed air from a high-pressure source; an upstream duct configured to receive one or both of the low-pressure compressed air and the high-pressure compressed air; a downstream duct configured to provide a regulated compressed air to the pneumatic system; a high-pressure shutoff valve positioned between the high-pressure bleed tap and the upstream duct; a low-pressure non-return valve positioned between the low-pressure bleed tap and the upstream duct; a pressure regulating and shutoff valve positioned between the upstream duct and the downstream duct, the pressure regulating and shutoff valve configured to generate the regulated compressed air; and a pressure relief valve positioned within the upstream duct.

18 Claims, 4 Drawing Sheets

DUAL-PRESSURE SOURCE AIRCRAFT PNEUMATIC SYSTEM WITH PRESSURE RELIEF

FIELD

The present disclosure relates generally to aircraft pneumatic systems and, more particularly, to bleed air systems configured to bleed air from a compressor section of a gas turbine engine.

BACKGROUND

Gas turbine engines of the turbofan, turbojet and turboprop types typically include a compressor section, a combustor section and a turbine section. In general, during operation, air is pressurized in the compressor section and is mixed with fuel and burned in the combustor section to generate hot combustion gases. Subsequent to combustion, the hot combustion gases flow through the turbine section, which extracts energy from the hot combustion gases to power the compressor section and other gas turbine engine loads, such as those required to rotate fan blades in a fan section of a turbofan engine, where the fan section drives air along a bypass flow path. The compressor section typically includes low-pressure and high-pressure compressors, and the turbine section includes low-pressure and high-pressure turbines.

Many current aircraft, including commercial and business aircraft, use bleed air extracted from the main engines to supply conditioned air to various pneumatic systems, such as, for example, deicing or anti-icing systems or environmental control systems. This includes commercial passenger and cargo aircraft and business jet aircraft that are powered by turbojet, turbofan or turboprop engines. The air extracted from the main engines is supplied to and controlled by a bleed air system. The bleed air system is typically comprised of a series of valves, ducting and a pre-cooler, and extracts air from different ports of the compressor section of a gas turbine engine. This high-pressure and high temperature air may then be regulated or cooled before it is delivered downstream to the aircraft pneumatic systems.

SUMMARY

A bleed air system for a pneumatic system of an aircraft is disclosed. In various embodiments, the bleed air system includes a low-pressure bleed tap configured to bleed a low-pressure compressed air from a low-pressure source; a high-pressure bleed tap configured to bleed a high-pressure compressed air from a high-pressure source; an upstream duct configured to receive one or both of the low-pressure compressed air and the high-pressure compressed air; a downstream duct configured to provide a regulated compressed air to the pneumatic system; a high-pressure shutoff valve positioned between the high-pressure bleed tap and the upstream duct; a low-pressure non-return valve positioned between the low-pressure bleed tap and the upstream duct; a pressure regulating and shutoff valve positioned between the upstream duct and the downstream duct, the pressure regulating and shutoff valve configured to generate the regulated compressed air; and a pressure relief valve positioned within the upstream duct.

In various embodiments, the high-pressure shutoff valve includes one or more bleed orifices configured to allow a bypass flow to pass through the high-pressure shutoff valve when in a closed position during a non-operational state of the bleed air system and while the aircraft is in an operational state. In various embodiments, the one or more bleed orifices is configured to maintain an upstream duct pressure of a compressed air in the upstream duct to be lower than the pressure of the high-pressure compressed air at the high-pressure bleed tap and higher than the pressure of the low-pressure compressed air at the low-pressure bleed tap during the non-operational state. In various embodiments, the low-pressure non-return valve is constrained from movement via the upstream duct pressure of the compressed air in the upstream duct during the non-operational state.

In various embodiments, the pressure relief valve is integrated into at least one of the high-pressure shutoff valve or the low-pressure non-return valve. In various embodiments, the pressure relief valve is configured to exhaust the compressed air to the atmosphere or to a location along the downstream duct, downstream of the pressure regulating and shutoff valve via a bypass duct. In various embodiments, the pressure relief valve is a self-regulating pressure relief valve. In various embodiments, the pressure relief valve is an actively controlled pressure relief valve.

In various embodiments, a downstream pressure transducer is configured to monitor a downstream duct pressure of a compressed air in the downstream duct. In various embodiments, an upstream pressure transducer is configured to monitor an upstream duct pressure of a compressed air in the upstream duct. In various embodiments, a controller is operatively connected to the upstream pressure transducer and configured to detect a failure of one or more of the high-pressure shutoff valve, the pressure regulating and shutoff valve and the pressure relief valve based on an input signal received from the upstream pressure transducer and to regulate the downstream duct pressure of the compressed air in the downstream duct.

In various embodiments, the low-pressure source is one of a low-pressure compressor or a high-pressure compressor. In various embodiments, the high-pressure source is one of the low-pressure compressor or the high-pressure compressor. In various embodiments, the pneumatic system is one of an anti-icing system or an environmental control system.

A gas turbine engine is disclosed. In various embodiments, the gas turbine engine includes a low-pressure compressor; a high-pressure compressor; and a bleed air system, the bleed air system including a low-pressure bleed tap configured to bleed a low-pressure compressed air from the low-pressure compressor or the high-pressure compressor, a high-pressure bleed tap configured to bleed a high-pressure compressed air from the low-pressure compressor or the high-pressure compressor, an upstream duct configured to receive one or both of the low-pressure compressed air and the high-pressure compressed air, a downstream duct configured to provide a regulated compressed air to a pneumatic system, a high-pressure shutoff valve positioned between the high-pressure bleed tap and the upstream duct, a low-pressure non-return valve positioned between the low-pressure bleed tap and the upstream duct, a pressure regulating and shutoff valve positioned between the upstream duct and the downstream duct, the pressure regulating and shutoff valve configured to generate the regulated compressed air, and a pressure relief valve positioned within the upstream duct.

In various embodiments, the high-pressure shutoff valve includes one or more bleed orifices configured to allow a bypass flow to pass through the high-pressure shutoff valve when in a closed position during a non-operational state of the bleed air system and while the gas turbine engine is in an operational state. In various embodiments, the one or more bleed orifices is configured to maintain an upstream duct pressure of a compressed air in the upstream duct to be lower than the pressure of the high-pressure compressed air at the high-pressure bleed tap and higher than the pressure of the low-pressure compressed air at the low-pressure bleed tap during the non-operational state. In various embodiments, the pressure relief valve is integrated into one at least one of the high-pressure shutoff valve and the low-pressure non-return valve.

In various embodiments, a downstream pressure transducer is configured to monitor a downstream duct pressure in the downstream duct and an upstream pressure transducer configured to monitor the upstream duct pressure in the upstream duct. In various embodiments, a controller is operatively connected to the upstream pressure transducer and configured to detect a failure of one or more of the high-pressure shutoff valve, the pressure regulating and shutoff valve and the pressure relief valve based on an input signal received from the upstream pressure transducer and to regulate the downstream duct pressure of the compressed air in the downstream duct.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
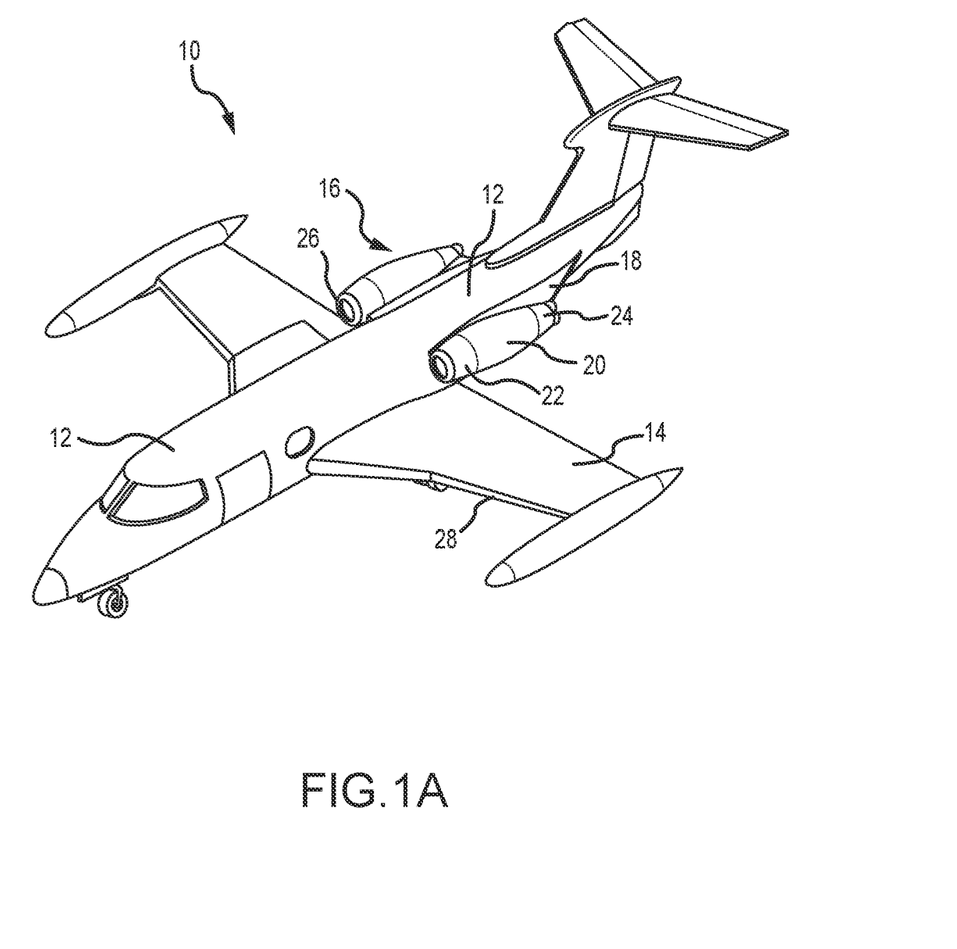
FIG. 1A illustrates an aircraft having fuselage mounted gas turbine engines, in accordance with various embodiments.

Referring now to the drawings, FIG. 1A schematically illustrates an aircraft 10, in accordance with various embodiments. The aircraft 10 generally includes a fuselage 12 extending the length of the aircraft 10. A wing 14 is attached to and extends from respective sides of the fuselage 12. A gas turbine engine 16 is likewise attached to and extends from respective sides of the fuselage 12. In various embodiments, the gas turbine engine 16 is attached to the fuselage 12 via a pylon 18. Further, in various embodiments, the gas turbine engine 16 includes a fan cowl assembly 20, an inlet section 22 and a thrust reverser 24. In various embodiments, the gas turbine engine 16 includes an anti-icing system 26 (or a deicing system) for the nacelle inlet and the wing 14 includes an anti-icing system 28 (or a deicing system) for the leading edge. Note that while FIG. 1A depicts the gas turbine engine 16 as being attached to the side of the fuselage 12, the disclosure contemplates, without loss of generality, the gas turbine engine 16 being attached to an underside of the wing 14. The concepts described by the disclosure are the same regardless of where the gas turbine engine 16 is located on or how the gas turbine engine 16 is otherwise attached to the aircraft 10.

Figure 1B:
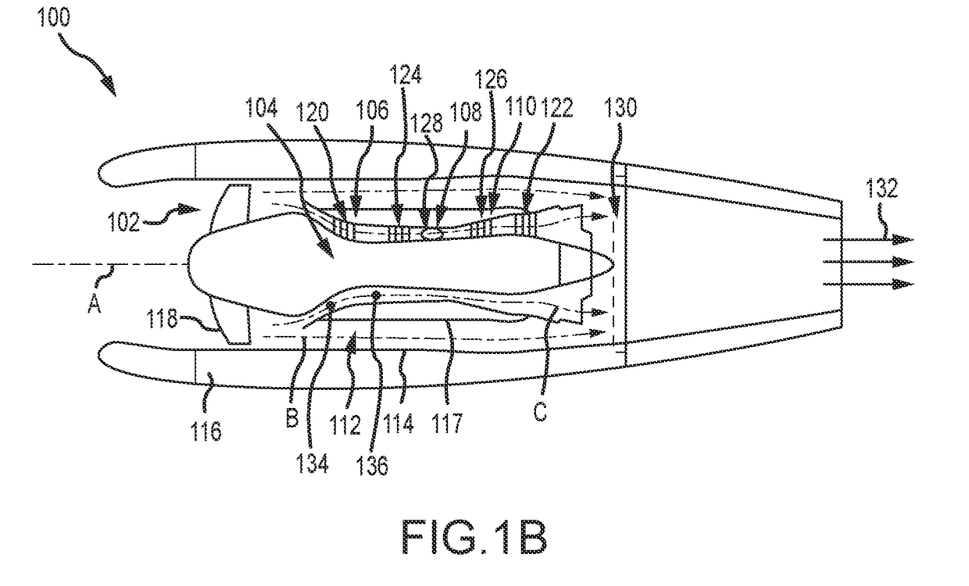
FIG. 1B illustrates a schematic cross-sectional view of a gas turbine engine, in accordance with various embodiments.

With continued reference to the drawings, FIG. 1B schematically illustrates a gas turbine engine 100 of the turbofan variety, similar to the gas turbine engine 16 described above with reference to FIG. 1A. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 114 of a nacelle 116 and an outer casing 117 of the core engine section 104, while the compressor section 106 drives air along a core flow path C of the core engine section 104 for compression and communication into the combustor section 108 and then expansion through the turbine section 110.

The core engine section 104 may generally include a low-speed spool and a high-speed spool mounted for rotation about a central longitudinal axis A. The low-speed spool generally includes an inner shaft that interconnects a fan 118 within the fan section 102, a low-pressure compressor 120 within the compressor section 106 and a low-pressure turbine 122 within the turbine section 110. The inner shaft may be connected to the fan 118 through a speed change mechanism or gear box to drive the fan 118 at a lower rotational speed than the rotational speed of the low-speed spool. The high-speed spool generally includes an outer shaft that interconnects a high-pressure compressor 124 within the compressor section 106 and a high-pressure turbine 126 within the turbine section 110. A combustor 128 is arranged in the combustor section 108 between the high-pressure compressor 124 and the high-pressure turbine 126. The air passing through the bypass flow path B mixes with the combustion gases exiting the core flow path C in a mixing section 130 positioned downstream of the core engine section 104 prior to discharge as a mixed exhaust stream 132, which provides the thrust achieved by the gas turbine engine 100. In various embodiments, as described further below, a low-pressure bleed tap 134 is positioned proximate a stage of the low-pressure compressor 120 and a high-pressure bleed tap 136 is positioned proximate stage of the high-pressure compressor 124. The low-pressure bleed tap 134 and the high-pressure bleed tap 136 are configured to bleed compressed air, respectively, from the low-pressure compressor 120 and the high-pressure compressor 124 to supply compressed air to various pneumatic systems throughout the aircraft, such as, for example, deicing or anti-icing systems or environmental control systems.

Figure 2A:
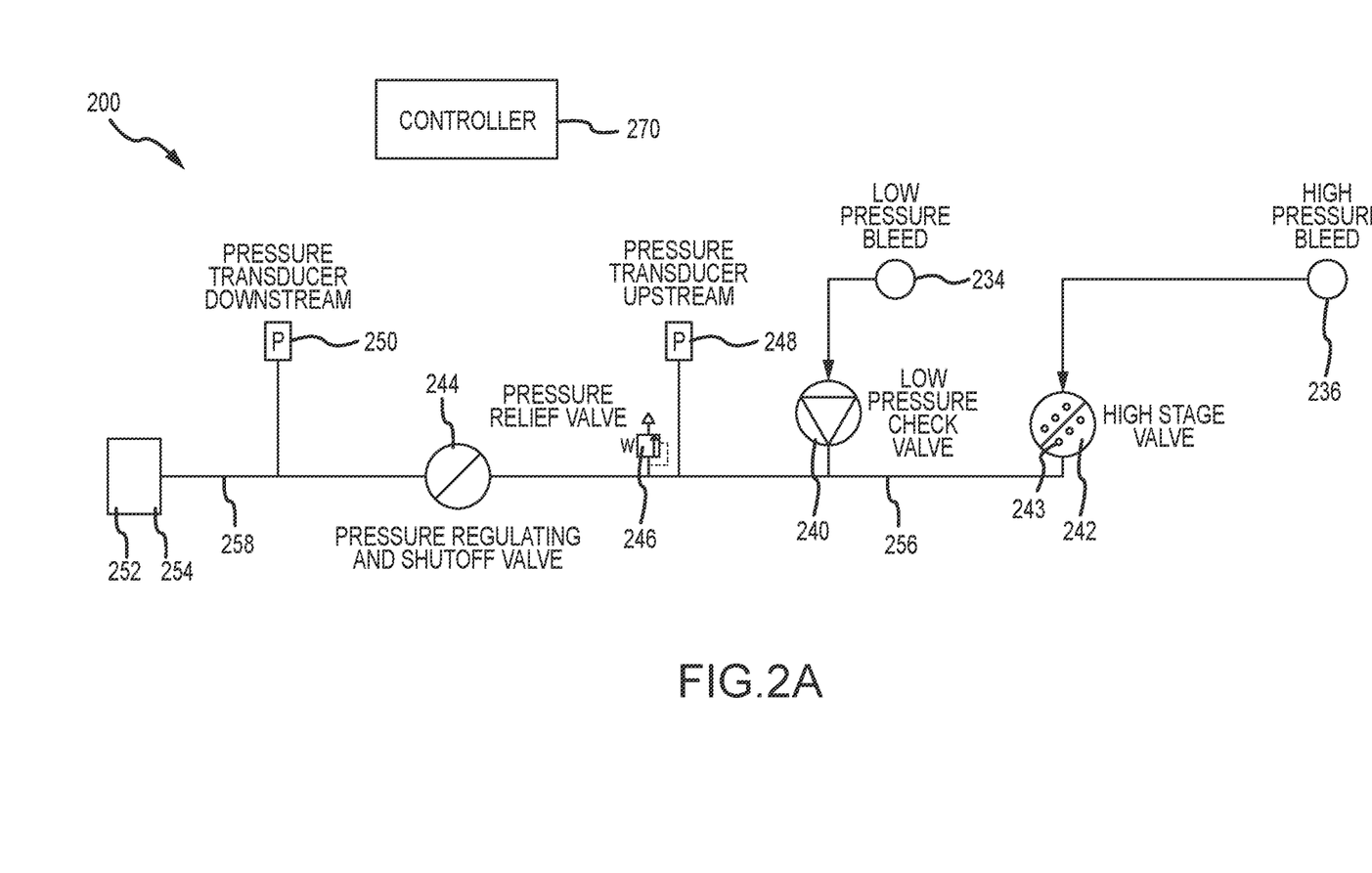
FIG. 2A illustrates a schematic view of a bleed air system, in accordance with various embodiments.
Figure 2B:
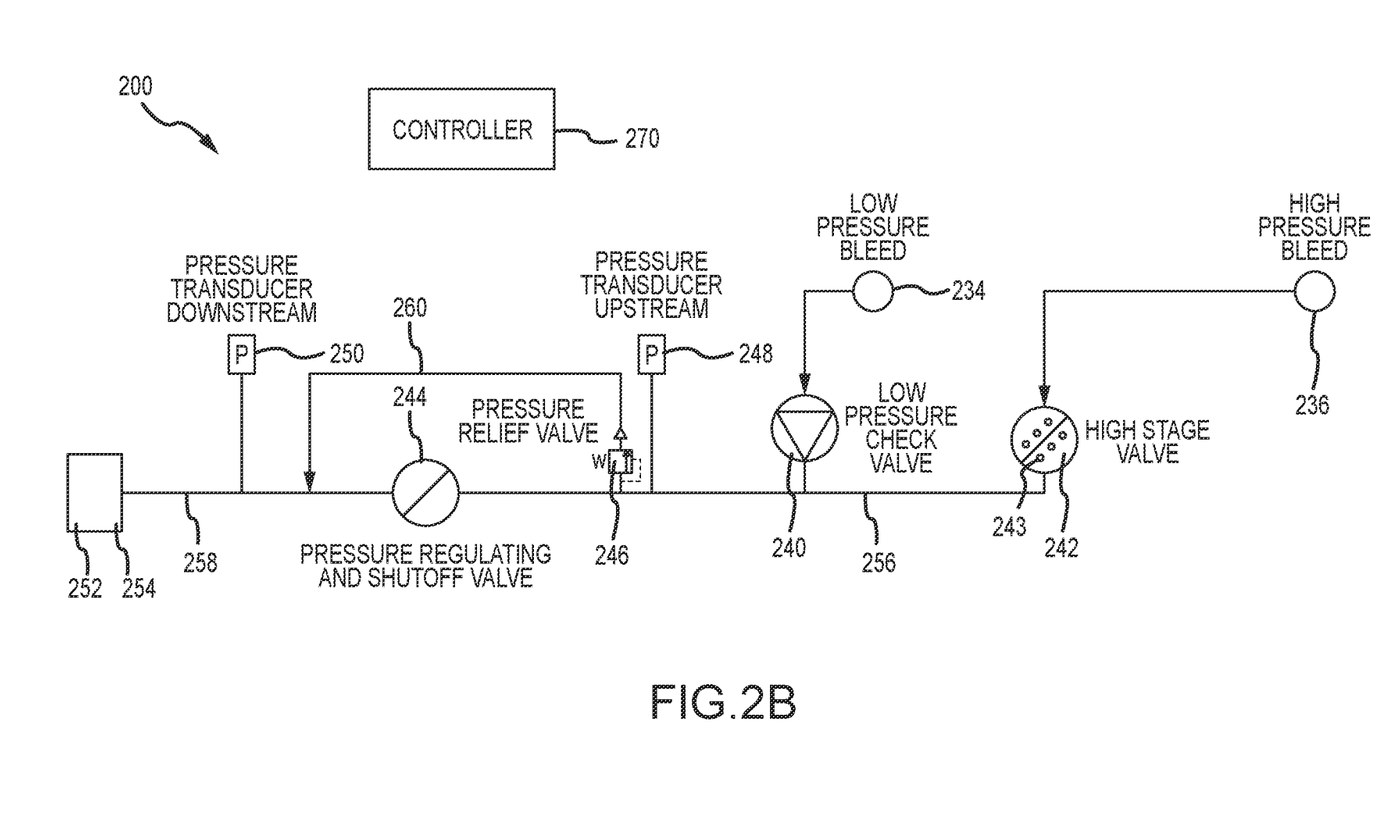
FIG. 2B illustrates a schematic view of a bleed air system, in accordance with various embodiments.

Referring now to FIGS. 2A and 2B, schematic illustrations of a bleed air system 200 for an aircraft are provided, in accordance with various embodiments. The bleed air system 200 includes a low-pressure bleed tap 234 configured to bleed a low-pressure compressed air from a low-pressure source, such as, for example, the low-pressure compressor 120 described above with reference to FIG. 1B. Similarly, a high-pressure bleed tap 236 is configured to bleed a high-pressure compressed air from a high-pressure source (relative to the low-pressure source), such as, for example, the high-pressure compressor 124 described above with reference to FIG. 1B. A low-pressure non-return valve 240 (or a low-pressure check valve) is positioned downstream of the low-pressure bleed tap 234 to prevent high-pressure air bled from the high-pressure compressor at the high-pressure bleed tap 236 from backflowing into the low-pressure compressor. A high-pressure shutoff valve 242 (or a high stage valve) is positioned downstream of the high-pressure bleed tap 236 and upstream of the low-pressure non-return valve 240. The high-pressure shutoff valve 242 facilitates, among other things, operation of the bleed air system 200 in a low-pressure mode, without a high-pressure input from the high-pressure bleed tap 236.

Note that while the high-pressure bleed tap 236 is described as bleeding compressed air from the high-pressure compressor, the disclosure contemplates both the low-pressure bleed tap 234 and the high-pressure bleed tap 236 being configured to bleed air from the low-pressure compressor only. For example, in various embodiments, the low-pressure bleed tap 234 may be configured to bleed compressed air from a fourth or fifth stage of the low-pressure compressor, while the high-pressure bleed tap 236 may be configured to bleed compressed air from an eleventh or twelfth stage of the low-pressure compressor. The disclosure contemplates a similar arrangement using the high-pressure compressor only. For example, in various embodiments, the low-pressure bleed tap 234 may be configured to bleed compressed air from a fourth or fifth stage of the high-pressure compressor, while the high-pressure bleed tap 236 may be configured to bleed compressed air from an eleventh or twelfth stage of the high-pressure compressor. The common theme among the various embodiments is the high-pressure bleed tap 236 will be configured and positioned to bleed compressed air at a higher pressure than the pressure of the compressed air being bled at the low-pressure bleed tap 234.

Still referring to FIGS. 2A and 2B, the bleed air system 200 includes a pressure regulating and shutoff valve 244. The pressure regulating and shutoff valve 244 is positioned downstream of both the low-pressure bleed tap 234 and the high-pressure bleed tap 236 and configured to control or modulate, and to shut off or turn on, the flow of compressed air within the bleed air system 200. The pressure regulating and shutoff valve 244 is also positioned upstream of the various pneumatic systems to which the compressed air is being delivered, such as, for example, a deicing or anti-icing system 252 or an environmental control system 254. In various embodiments, the pressure regulating and shutoff valve 244 enables delivery of compressed air at different flow rates and at different pressures depending on the requirements of the various pneumatic systems to which the compressed air is being delivered. In various embodiments, the pressure regulating and shutoff valve 244 comprises a self-regulating valve or an actively controlled valve (e.g., via a controller) based on the pressure of the compressed air upstream and downstream of the pressure regulating and shutoff valve 244 or any other engine, pneumatic system or environmental parameter pertinent to operation of the bleed air system 200 or the pneumatic system to which compressed air is being delivered. Positioned upstream of the pressure regulating and shutoff valve 244 and downstream of both the low-pressure bleed tap 234 and the high-pressure bleed tap 236 is a pressure relief valve 246. In various embodiments, the pressure relief valve 246 is configured to ensure the pressure of the compressed air in the bleed air system 200 or at the various pneumatic systems to which the compressed air is being delivered does not exceed a maximum design pressure. In various embodiments, the pressure relief valve 246 comprises a self-regulating pressure relief valve (e.g., a self-activating valve) or an actively controlled pressure relief valve (e.g., via a controller).

An upstream pressure transducer 248 is positioned upstream of the pressure regulating and shutoff valve 244 and downstream of both the low-pressure bleed tap 234 and the high-pressure bleed tap 236. The upstream pressure transducer 248 is configured to monitor the pressure of the compressed air in an upstream duct 256 (e.g., an upstream duct pressure), which connects each of the high-pressure shutoff valve 242, the low-pressure non-return valve 240 and the pressure regulating and shutoff valve 244. A downstream pressure transducer 250 is positioned downstream of the pressure regulating and shutoff valve 244 and upstream of the various pneumatic systems to which the compressed air is being delivered, such as, for example, the deicing or anti-icing system 252 or the environmental control system 254. The downstream pressure transducer 250 is configured to monitor the pressure of the compressed air in a downstream duct 258 (e.g., a downstream duct pressure), which connects each of the pressure regulating and shutoff valve 244 and the pneumatic system to which the compressed air is being delivered. Without loss of generality, the pressure of the compressed air in a downstream duct 258 may be considered a regulated compressed air that is regulated via the pressure regulating and shutoff valve 244. In various embodiments, the high-pressure shutoff valve 242 comprises one or more bleed orifices 243 configured to better control pressurization of the upstream duct 256 (e.g., to reduce pressure fluctuations) and to prevent the components within the low-pressure non-return valve 240 from moving or flapping when the bleed air system 200 assumes a non-operational state while the aircraft or the compressor is in an operational state; such situation may occur, for example, when the aircraft is operating but the bleed air system 200 is not currently being used to supply compressed air to a pneumatic system. In various embodiments, for example, the one or more bleed orifices 243 enable a small quantity of high-pressure compressed air (e.g., a bypass flow) to pass through the high-pressure shutoff valve 242 when in the closed (or shutoff) position. This enables the pressure of the compressed air in the upstream duct 256 to be lower than the pressure of the high-pressure compressed air at the high-pressure bleed tap 236 and higher than the low-pressure compressed air at the low-pressure bleed tap 234 during a non-operational state, thereby ensuring a sufficient pressure in the upstream duct 256 to prevent the low-pressure non-return valve 240 from opening (or moving or flapping) when the bleed air system 200 is non-operational, although the engine is operational.

The bleed air system 200 also includes a controller 270 configured to control operation of the various valves described above. For example, the controller 270 is connected to and receives input signals (or an input signal) from the cockpit concerning the various pneumatic systems to which the compressed air is to be or is being delivered or from the pneumatic systems themselves. Similarly, the controller 270 is connected to and receives input signals (or an input signal) from the upstream pressure transducer 248 and the downstream pressure transducer 250 concerning the measured pressures, respectively, in the upstream duct 256 and the downstream duct 258. In various embodiments, the controller 270 is also connected to and provides output signals (or an output signal) to the high-pressure shutoff valve 242, the low-pressure non-return valve 240 and the pressure regulating and shutoff valve 244, as well as to the low-pressure bleed tap 234 and the high-pressure bleed tap 236. Depending on the input signals received by the controller 270, the controller 270, in response, controls or monitors operation of the various valves, the low-pressure bleed tap 234 and the high-pressure bleed tap 236, and the various pneumatic systems to which the compressed air is being delivered. In various embodiments, the controller 270 is also configured to provide output signals to the cockpit concerning the various pneumatic systems to which the compressed air is to be or is being delivered or to the pneumatic systems themselves. Similarly, the controller 270 may also be configured to receive input signals from the high-pressure shutoff valve 242, the low-pressure non-return valve 240 and the pressure regulating and shutoff valve 244, as well as from the low-pressure bleed tap 234 and the high-pressure bleed tap 236. Typically, the various input signals received by the controller 270 concern operational commands or status of the various components of the bleed air system 200 or pressure measurements of the compressed air within the upstream duct 256 and the downstream duct 258 or at the low-pressure bleed tap 234 and the high-pressure bleed tap 236. In various embodiments, the controller 270 is configured to detect a failure of one or more of the high-pressure shutoff valve 242, the pressure regulating and shutoff valve 244 and the pressure relief valve 246 based on an input signal received from the upstream pressure transducer 248. The controller 270 is also configured to regulate the pressure of the compressed air in the downstream duct 258 (e.g., via control signals sent to the pressure regulating and shutoff valve 244) to be supplied to, for example, the deicing or anti-icing system 252 or the environmental control system 254. In various embodiments, system program instructions or controller instructions may be loaded onto a tangible, non-transitory, computer-readable medium (also referred to herein as a tangible, non-transitory, memory) having instructions stored thereon that, in response to the input signals described above, cause the controller 270 to perform various operations, including controlling the various valves comprised within the bleed air system 200.

The above disclosure provides a bleed air system (e.g., the bleed air system 200) that exhibits less complexity and less overall system weight than do current bleed air systems. In various embodiments, for example, the pressure relief valve 246 is configured such that lower pressures (or a lower maximum pressure) in the upstream duct 256 may be maintained. This feature enables the low-pressure non-return valve 240 and the pressure regulating and shutoff valve 244 to be designed for lower operating pressures, which contributes to lower-weight components. Further, the various components comprising the ducting system—e.g., the upstream duct 256—may be designed based on lower burst pressures (or lower maximum pressures), which also contributes to lower-weight components. Consistent with the foregoing, the pressure relief valve 246 may be designed to regulate the pressure of the compressed air in the upstream duct 256 to a specific maximum pressure. In various embodiments, the maximum pressure may be tuned to ensure the low-pressure non-return valve 240 is closed during non-operational conditions, preventing excessive mechanical cycles of the components within the low-pressure non-return valve 240. Further, reducing the maximum pressure of the pressure relief valve 246 (e.g., the maximum pressure in the upstream duct 256, above which the pressure relief valve 246 opens) to a pressure below the maximum pressure of the compressed air bled from the high-pressure bleed tap 236 enables the low-pressure non-return valve 240 and the pressure regulating and shutoff valve 244 to be designed using lower-weight components. In the event the pressure relief valve 246 is activated (e.g., due to an over-pressure in the upstream duct 256), the pressure relief valve 246 is configured to either dump (e.g., directly to the atmosphere) the compressed air within the upstream duct 256 (as depicted in FIG. 2A) or to route the compressed air out of the upstream duct 256 and to the downstream duct 258, via a bypass duct 260 (as depicted in FIG. 2B), at which point the compressed air within the bleed air system 200 may be handled by other systems, such as, for example, the deicing or anti-icing system 252 or the environmental control system 254 or another system. Further, in various embodiments, the pressure relief valve 246 may be integrated into the high-pressure shutoff valve 242 or into the pressure regulating and shutoff valve 244. Other benefits of the bleed air system disclosed herein is the ability to optimize the consumption of bleed air during various of the flight regimes—e.g., takeoff, ascent, cruise, decent and landing—to maximize the specific fuel consumption.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by *In Re Nuijten* to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Finally, any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A bleed air system for a pneumatic system of an aircraft, comprising:
   a low-pressure bleed tap configured to bleed a low-pressure compressed air from a low-pressure source;
   a high-pressure bleed tap configured to bleed a high-pressure compressed air from a high-pressure source;
   an upstream duct configured to receive one or both of the low-pressure compressed air and the high-pressure compressed air;
   a downstream duct configured to provide a regulated compressed air to the pneumatic system;
   a high-pressure shutoff valve positioned between the high-pressure bleed tap and the upstream duct, the high pressure shutoff valve including one or more bleed orifices, the one or more bleed orifices configured to maintain an upstream duct pressure of a compressed air in the upstream duct to be lower than the pressure of the high-pressure compressed air at the high-pressure bleed tap and higher than the pressure of the low-pressure compressed air at the low-pressure bleed tap during the non-operational state;
   a low-pressure non-return valve positioned between the low-pressure bleed tap and the upstream duct;
   a pressure regulating and shutoff valve positioned between the upstream duct and the downstream duct, the pressure regulating and shutoff valve configured to generate the regulated compressed air; and
   a pressure relief valve positioned within the upstream duct.

2. The bleed air system of claim 1, wherein the one or more bleed orifices configured to allow a bypass flow to pass through the high-pressure shutoff valve when in a closed position during a non-operational state of the bleed air system and while the aircraft is in an operational state.

3. The bleed air system of claim 2, wherein the low-pressure non-return valve is constrained from movement via the upstream duct pressure of the compressed air in the upstream duct during the non-operational state.

4. The bleed air system of claim 1, wherein the pressure relief valve is integrated into at least one of the high-pressure shutoff valve or the low-pressure non-return valve.

5. The bleed air system of claim 1, wherein the pressure relief valve is configured to exhaust the compressed air to the atmosphere or to a location along the downstream duct, downstream of the pressure regulating and shutoff valve via a bypass duct.

6. The bleed air system of claim 1, wherein the pressure relief valve is a self-regulating pressure relief valve.

7. The bleed air system of claim 1, wherein the pressure relief valve is an actively controlled pressure relief valve.

8. The bleed air system of claim 1, further comprising a downstream pressure transducer configured to monitor a downstream duct pressure of a compressed air in the downstream duct.

9. The bleed air system of claim 1, further comprising an upstream pressure transducer configured to monitor an upstream duct pressure of a compressed air in the upstream duct.

10. The bleed air system of claim 9, further comprising a controller, the controller being operatively connected to the upstream pressure transducer and configured to detect a failure of one or more of the high-pressure shutoff valve, the pressure regulating and shutoff valve and the pressure relief valve based on an input signal received from the upstream pressure transducer and to regulate the downstream duct pressure of the compressed air in the downstream duct.

11. The bleed air system of claim 1, wherein the low-pressure source is one of a low-pressure compressor or a high-pressure compressor.

12. The bleed air system of claim 11, wherein the high-pressure source is one of the low-pressure compressor or the high-pressure compressor.

13. The bleed air system of claim 12, wherein the pneumatic system is one of an anti-icing system or an environmental control system.

14. A gas turbine engine, comprising:
a low-pressure compressor;
a high-pressure compressor; and
a bleed air system, the bleed air system including
a low-pressure bleed tap configured to bleed a low-pressure compressed air from the low-pressure compressor or the high-pressure compressor,
a high-pressure bleed tap configured to bleed a high-pressure compressed air from the low-pressure compressor or the high-pressure compressor wherein the high-pressure shutoff valve includes one or more bleed orifices, the one or more bleed orifices configured to maintain an upstream duct pressure of a compressed air in the upstream duct to be lower than the pressure of the high-pressure compressed air at the high-pressure bleed tap and higher than the pressure of the low-pressure compressed air at the low-pressure bleed tap during the non-operational state,
an upstream duct configured to receive one or both of the low-pressure compressed air and the high-pressure compressed air,
a downstream duct configured to provide a regulated compressed air to a pneumatic system,
a high-pressure shutoff valve positioned between the high-pressure bleed tap and the upstream duct,
a low-pressure non-return valve positioned between the low-pressure bleed tap and the upstream duct,
a pressure regulating and shutoff valve positioned between the upstream duct and the downstream duct, the pressure regulating and shutoff valve configured to generate the regulated compressed air, and
a pressure relief valve positioned within the upstream duct.

15. The gas turbine engine of claim 14, configured to allow a bypass flow to pass through the high-pressure shutoff valve when in a closed position during a non-operational state of the bleed air system and while the gas turbine engine is in an operational state.

16. The gas turbine engine of claim 15, wherein the pressure relief valve is integrated into one at least one of the high-pressure shutoff valve and the low-pressure non-return valve.

17. The gas turbine engine of claim 15, further comprising a downstream pressure transducer configured to monitor a downstream duct pressure in the downstream duct and an upstream pressure transducer configured to monitor the upstream duct pressure in the upstream duct.

18. The gas turbine engine of claim 17, further comprising a controller, the controller being operatively connected to the upstream pressure transducer and configured to detect a failure of one or more of the high-pressure shutoff valve, the pressure regulating and shutoff valve and the pressure relief valve based on an input signal received from the upstream pressure transducer and to regulate the downstream duct pressure of the compressed air in the downstream duct.

\* \* \* \* \*